Dec. 20, 1960   R. E. NOVKOV   2,964,833
CUTOFF TOOL AND HOLDER THEREFOR
Original Filed May 2, 1955   2 Sheets-Sheet 1

INVENTOR.
RAYMOND E. NOVKOV
BY
J. William Freeman
ATTORNEY

Dec. 20, 1960  R. E. NOVKOV  2,964,833
CUTOFF TOOL AND HOLDER THEREFOR
Original Filed May 2, 1955  2 Sheets-Sheet 2

INVENTOR.
RAYMOND E. NOVKOV
BY
J. William Freeman
ATTORNEY

United States Patent Office 2,964,833
Patented Dec. 20, 1960

2,964,833
CUTOFF TOOL AND HOLDER THEREFOR

Raymond E. Novkov, Akron, Ohio, assignor to Manchester Machine & Tool Co., Akron, Ohio, a corporation of Ohio Original application May 2, 1955, Ser. No. 505,488, now Patent No. 2,846,756, dated Aug. 12, 1958. Divided and this application May 7, 1958, Ser. No. 733,590

2 Claims. (Cl. 29—95)

This invention relates to machine tools, and in particular, relates to an improved type of cutoff or parting equipment for use on lathes and other turning or cutoff machinery of known construction.

It has long been known in the prior art that a length of work can be cut or trimmed into a shorter length during the supported rotational movement thereof by the application of a cutting tool against the rotating external surface of the work. In the great majority of cases, such cutoff operations are effectuated by the use of a lathe, with the work being rotatably supported about its central axis over the lathe bed; while the cutoff tool is secured to the cross-slide carriage so as to move transversely of the lathe bed and thus engage the rotating work surface.

To the present time, cutoff tools of known construction have been characterized by their inability to fully attain one or more of the following desired requirements:

First, the cutting edge per se of the cutoff tool must be positioned so that the same will be fed through a horizontal plane that extends through the center line of the work as defined by its position of mounting on the tail stock or face plate of the lathe. This requirement insures correct contact between the cutting edge and the revolving work piece. In many instances, the prior art has failed in this requirement because of the fact that the cutting tool, upon repositioning after removal for grinding, for example, is not correctly relocated in the carriage tool holder of the cross-slide, and accordingly, the cutting surface is not positioned in the required horizontal plane that is above described.

The second requirement of correct cutoff tool construction is that the cutoff bit per se be rigidly and solidly supported at all times during the cutoff operation, so that any detrimental vibration or "chatter" is avoided. The "quick-change" requirements of present day machine tool practice has heretofore limited the amount of support that can be utilized at the present time, with the result that conventional cutoff tools are at the present time subject, almost without exception, to varying degrees of vibrational "chatter" that accordingly limits the efficiency of the cutoff operation.

A third requirement for the theoretically ideal cutoff tool is that the tool bit and the support therefor be capable of rapidly dissipating the relatively high temperature that occurs at the point of cut, so as to avoid premature tool damage that occurs as a result of hot "chips" welding to the cutoff tool upon their removal from the work piece during the cutoff operation.

The provision of an improved type of cutoff tool meeting each and every one of the above requirements is accordingly the principal object of this invention.

It is a further object of this invention to provide a cutoff tool attaining the above requirements and being characterized by the presence of an improved type of tool bit that is low in original cost and which can be removed and accurately replaced with respect to the holder therefor, with a minimum time loss.

It is a still further object of this invention to provide an improved type of cutoff tool having an improved tool bit that is firmly supported on a plurality of its surfaces by the body portion of said cutoff tool.

It is a still further object of this invention to provide an improved cutoff tool having a tool bit that is rigidly supported with respect to the body portion of the tool, but which can be easily and quickly removed therefrom with a minimum time loss. It is a still further object of this invention to provide an improved cutoff tool having means incorporated therein for rapidly dissipating the heat occurring at the point of cutting contact between the cutoff tool and the work surface that is engaged thereby.

These and other objects of the invention will become more apparent upon a reading of the following brief specification, considered and interpreted in the light of the accompanying drawings.

Figure 1:
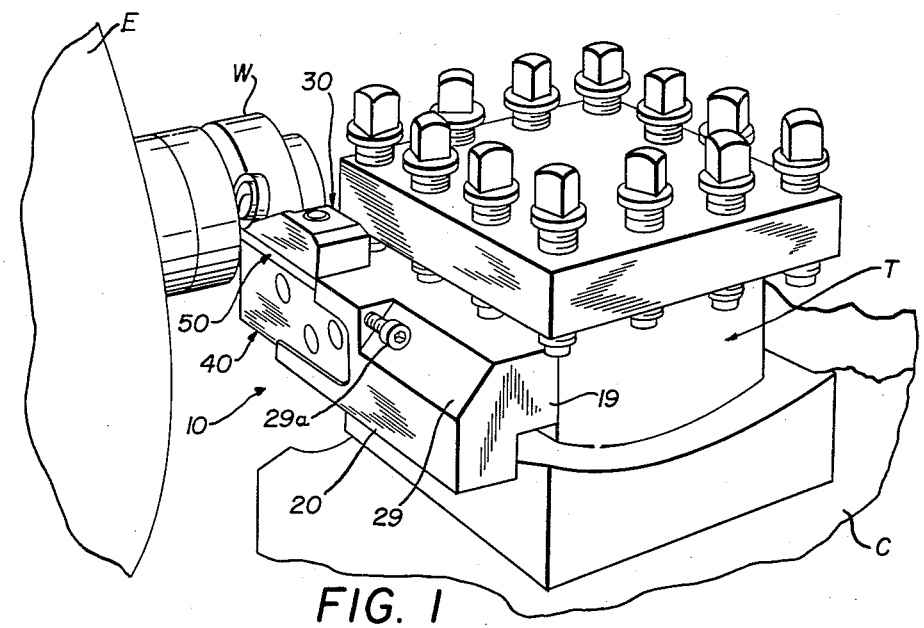
Figure 1 is a perspective view illustrating the improved tool holder positioned on the turret head of a conventional lathe so as to effectuate a cutoff operation on a rotating work piece.

Referring now to the drawings, and in particular, to Figure 1 thereof, the improved cutoff tool, generally designated as 10 is shown secured to the turret head T of the cross-slide carriage C, so as to effectuate a cutoff operation on a work piece W that is rotatably carried by end piece E in known manner.

Figure 2:
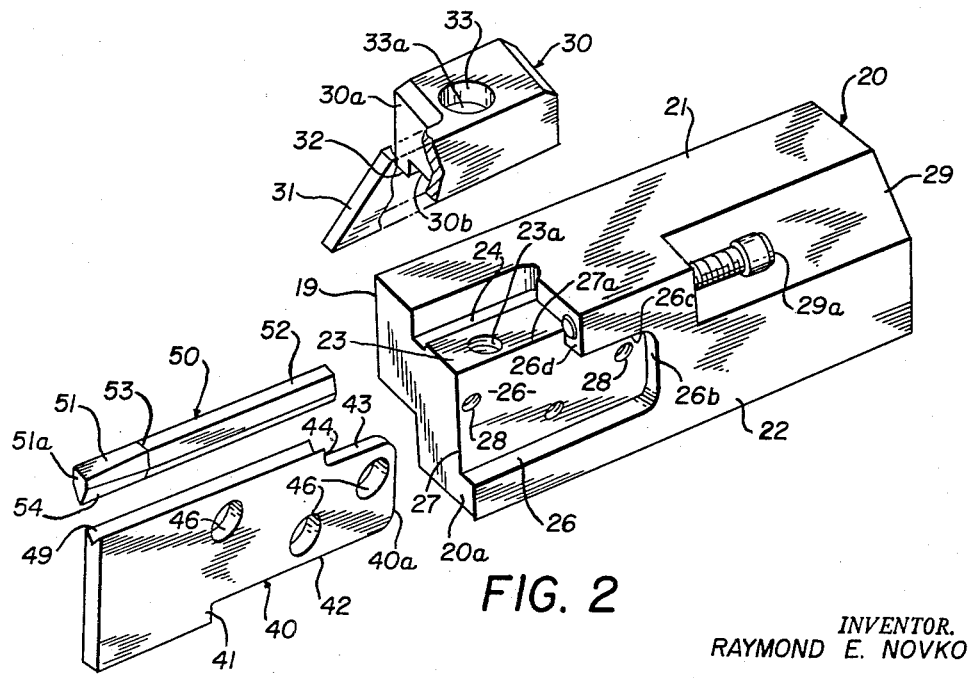
Figure 2 is an exploded perspective view of the improved cutoff tool of this invention.

The cutoff tool 10 per se, best illustrated in Figure 2 of the drawings, includes a tool body 20, a clamping block 30, a support blade 40, and a tool bit insert 50 that coact together to produce the improved cutoff tool 10.

To this end, the tool body 20 is shown as being of L-shaped cross-sectional configuration, wherein a top surface 21 and an abutting side surface 22 are provided for coaction with the members 30, 40 and 50, while the flange leg 19 thereof may be received within the turret head T in known manner to support the tool 10 during the cutoff operation.

For the purpose of receiving the clamping body 30, the surface 21 of the tool body 20 is undercut adjacent its front and side marginal edge portions to define a shallow recess that includes a recessed supporting surface 23 and a longitudinally extending groove 24. Both the surface 23 and groove 24 are located below the plane of the surface 21 so as to provide a seat for the complementally-shaped clamping block 30. Additionally, the surface 23 includes a tapped aperture 23a that receives a clamping bolt 25 that functions in known manner to fix the clamping block 30 with respect to the surfaces 23 and 24.

By like token, the side surface 22 of the tool body 20 is shown undercut to define a recessed surface 26 that is bounded by wall surfaces 26a, 26b, 26c and 26d; as well as the frontal surface 20a of the tool body 20. In this manner, the blade 40 can be positioned against the surface 26.

To permit this reception of the blade 40 the surface 26 further includes tapped apertures 28, 28, the spacing and arrangement of which will be discussed in greater detail in ensuing paragraphs. As best shown in Figure 2 of the drawings, the rear portion of the tool body 20 is provided with a beveled surface 29 that intersects with surfaces 21 and 22 to provide an access area that can be utilized to turn a threaded bolt 29a, the latter being threadingly operable longitudinally of one edge portion of body 20 to advance the cutting insert 50 when the same is longitudinally supported between the clamping block 30 and the support blade 40, as will be presently described.

Figure 3:
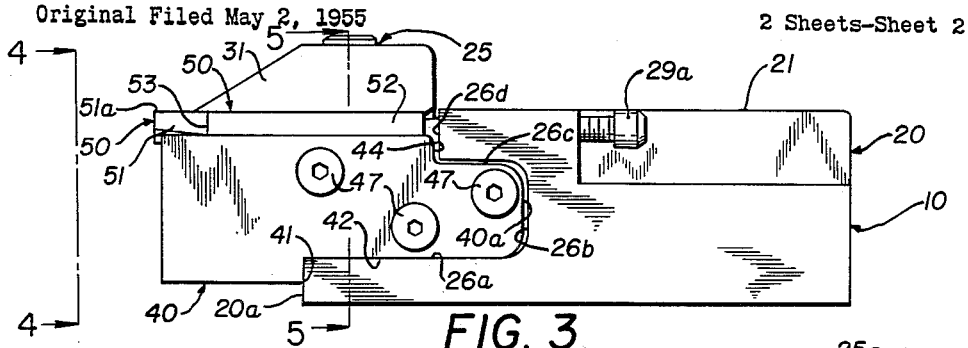
Figure 3 is a side elevation of the improved cutoff tool.
Figure 6:
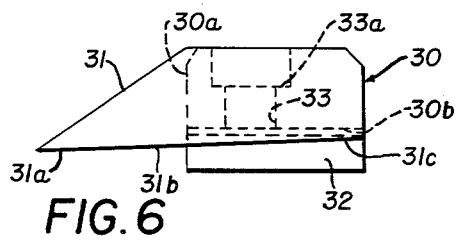
Figure 6 is a side elevation of a component element of an improved tool holder.
Figure 7:
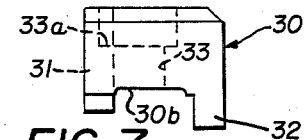
Figure 7 is an end elevation of the device shown in Figure 6 of the drawings.

Referring now to Figures 2, 6 and 7 of the drawings for detailed description of the clamping block 30 per se, it will be seen that the same is defined by a substantially rectangular body section that includes an integral extension arm 31 that extends outwardly from the front surface 30a thereof so as to longitudinally overlie the cutting insert 50 when the same is positioned in the assembled condition of Figure 3 of the drawings. In order that the degree of cantilevered support between arm 31 and cutting insert 50 be adequate adjacent the extreme free end 31a of the arm 31, the bottom surface 31b of arm 31 is shown tapered longitudinally between the spaced end portions 31a and 31c, with this degree of taper being shown in a somewhat exaggerated condition in Figure 6 of the drawings for the sake of clarity. It is to be understood that a taper in the nature of one or two degrees of taper could be employed without change of the principle herein involved.

Figure 4:
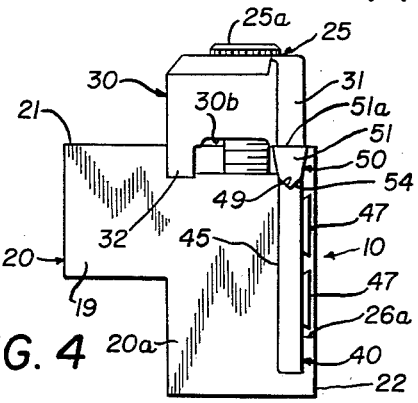
Figure 4 is a view taken on the lines 4—4 of Figure 3.
Figure 5:
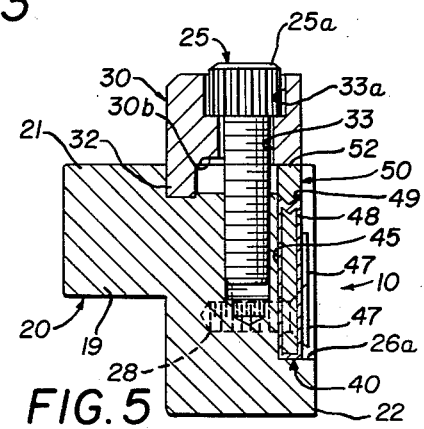
Figure 5 is a sectional view taken on the lines 5—5 of Figure 3.

In order that this tapered surface 31b of the arm 31 will accurately longitudinally overlie both the support blade 40 and the cutting insert 50 positioned thereon, the block 30 further includes a transversely spaced, longitudinally extending flange 32 that depends downwardly from the lower surface 30b of block 30 so as to seat in the groove 24 of body 20 upon attachment of block 30 to the body 20 (see Figures 4 and 5). This attachment between the body portion 20 and the block 30 is shown facilitated by the inclusion of an aperture 33 in the block 30; it being understood that this aperture 33 includes a shoulder 33a against which the head of the bolt 25 may be positioned so as to draw the clamping block 30 into firm engagement with tool bit 50 upon turning of the head 25a, in known manner.

With reference now to the construction of the support blade 40, the same is shown in Figure 2 of the drawings as being substantially rectangular in its planar configuration and specifically has the rear edge portion 40a thereof defined by offset edge portions 41, 42, 43 and 44 (see Figure 2) that are capable of being positioned adjacent the complemental surfaces defining the recessed surface 26 when the surface 45 of blade 40 is positioned in lateral, coplanar abutment with the surface 26 of body 20.

Figure 8:
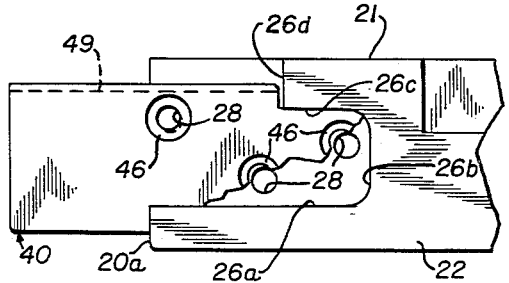
Figures 8 and 9 are partial elevations illustrating the relationship between certain component support elements of the improved tool holder.
Figure 9:
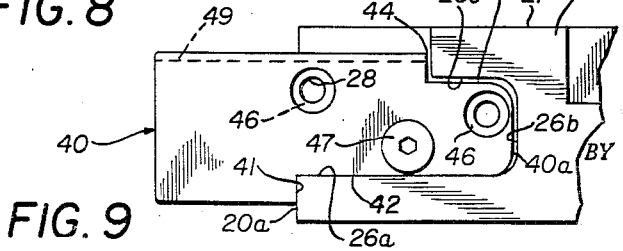

To the end of increasing the degree of supporting contact afforded by the walls 26a, 26b when the blade 40 is positioned as shown in Figure 3, the same (blade 40) includes a plurality of countersunk apertures 46, 46, the arrangement being such that these apertures 46, 46 are slightly out of alignment with the tapped apertures 28, 28 that are provided on the surface 26 of tool body 20 (see Figures 8 and 9). In this manner, the tightening of counter-sunk bolts 47, 47 in apertures 28, 28 will operate to shift the blade 40 downwardly and to the right of Figure 8, towards the position of Figure 9. In so moving, the edges 41 and 42 of blade 40 will be pulled or "drawn" into rigid, non-movable contact with the front surface 20a of tool body 20 and the wall surface 26a, respectively, to thus provide a rigid support for the tool bit 50. In the drawings, a minimum amount of clearance is shown existing between the edge portions 40a, 43 and 44 of blade 40 and the wall surfaces 26b, 26c and 26d, respectively; it being understood that the principal support for blade 40 comes from the front surface 20a and wall 26a.

For the purpose of supporting the tool bit 50 in longitudinally aligned relationship with the blade 40, the same (blade 40) is shown as having the top marginal edge portion thereof provided with a V-shaped groove 49 that receives a complementally shaped portion of the tool bit 50, in a manner to be described.

As an additional improvement, the blade 40 is shown in Figure 5 of the drawings as being copper plated to define a copper surrounding layer 48 that serves to improve the overall performance of the blade 40 in several ways. First, because of the heat-conducting property of copper, it is manifest that the heat will be rapidly dissipated through this outer layer 48, and additionally, premature damage to the support blade 40 will be obviated, in view of the fact that the chips being removed from the work piece W will not weld or otherwise fuse to a copper surface, whereas the same would tend to fuse or weld to the ordinary steel support surface heretofore employed. Another distinct advantage that arises from the use of copper plated support blade 40 of the character described, arises in view of the fact that the inherent ductility of the copper material provides a somewhat flexible seat for the insert bit 50, with the result that any irregularities in the same can be compensated for upon placement of insert 50 on the blade 40, followed by tightening down of clamping member 30 as previously described. It is apparent that other coatings having similar properties could be employed.

Turning now to the construction of the insert bit 50 per se, it will be seen from the drawings that the same is of elongated configuration and is further defined as having a cutting portion 51 that longitudinally abuts with a steel shank portion 52 that is brazed or welded thereto as at 53. A V-shaped edge portion 54 is provided on the underside of the longitudinally abutted members 51 and 42 for complemental, longitudinally shiftable reception in the V-shaped groove 49 of blade 40. The cutting portion 51 is preferably made of carbide or other suitable cutting material, while the shank 52 may be of ordinary steel. It is also apparent that the cutting end 51 of the insert bit 50 is provided with the usual side and front relief and/or rake angles so that the actual cutting edge 51 thereof can be properly in contact with the work surface W, in known manner.

In use or operation of the improved cutoff tool 10, the component parts such as the clamping block 30, support blade 40 and insert bit 50 must first be assembled with respect to the tool body 20 so that the thus assembled tool 10 can be ultimately positioned in the turret head T of a lathe to effectuate the cutting action shown in Figure 1 of the drawings.

To the end of effectuating this assembly, the support blade 40 is first positioned with respect to the surface 26 so that the surface 45 thereof laterally abuts the surface 26, while the edge portions 40a, 41, 43, 43 and 44 are respectively positioned adjacent the complemental surfaces provided therefor on tool body 20, as previously described. In this position of preliminary assembly, the support blade 40 will be substantially in the position shown in Figure 8 with the countersunk apertures 46, 46 being misaligned with respect to the apertures 28, 28 of the tool body 20. However, when the countersunk bolts 47, 47 are passed through the apertures 46, 46 and engage in threading contact within the apertures 28, 28, it is manifest that continued tightening of these bolts will result in the blade 40 being moved with respect to the body 20. The result of such movement is to shift the blade 40 downwardly and to the right of Figure 8 until the same approaches the position of Figure 9. When all three countersunk bolts 28, 28 have been positioned with the appropriate apertures as just described, it is manifest that the support blade 40 will be rigidly supported with respect to the tool body 20 by virtue of its pressurized contact between the complemental surfaces of these two members.

With the support blade 40 thus positioned, the clamping block 30 may be positioned so that the depending leg portion 32 thereof is received within the groove 24 of tool body 20, and at this time the bolt 33 may be passed through the aperture 34 of the clamping block 30 and "started" in the aperture 23a, the arrangement being such that the block 30 will be vertically shiftable during the time preceding the tightening down of the bolt 25.

When the clamping block 30 has been initially positioned with respect to the tool body 20, as just described, the insert bit 50 may be positioned on the support blade 40 with the V-shaped edge portion 54 thereof being received in the V-shaped groove 49 of the support blade 40 as shown in Figure 4 of the drawings. With the cutting insert bit 50 thus positioned, the head 25a of the bolt 25 may be turned so as to tighten down the clamp 30 with respect to the tool body 20. During this just described tightening of the clamping block 30, it is apparent that the front end 31a of the surface 31b will initially make contact with the forward edge of the cutting insert bit 50, in view of the fact that this front edge portion 31a is vertically below the end portion 31c due to the taper that is provided on the surface 31b. As this tightening continues, it is apparent that the end portion 31a of the arm 31 will be "sprung" upwardly so as to permit abutment of the rear surface 31c with the rear portion of the insert bit 50 as defined by the shank 52. Further tightening into the fully positioned location will result in full and complete contact being made between the surface 31b and the cutting insert bit 50.

At this time, the tool is ready for use, and the flange portion 19 thereof, as defined by surface 21 may be positioned between the conventional hold-down screws of a turret lathe head T and fixedly retained therein in known manner. At this point, adjustment of the horizontal cutting height of the cutting edge 51a may be made in known manner by merely raising or lowering the turret head T.

During the actual cutting operation, it is apparent that excessive heat will occur at the actual point of cutting as defined by the cutting edge 51. This excessive heat would normally operate to raise the temperature of the adjacent parts, but in the improved invention herein disclosed this rise in temperature will be resisted as a result of the copper plating provided on the support blade 40. It is additionally manifest that during this cutting operation any chips that may be removed from the work piece W will not fuse or weld to the support blade 40, in view of the fact that the same are incapable of fusion with the copper clad surface 48 thereof. It will also be noted that during the operation of the cutoff tool that the insert bit 50 is supported for substantially its entire length, on both the top and bottom surfaces thereof, by the support blade 40, and the surface 31b of the clamping block 30, respectively. It will be noted that the clamping pressure offered by the "sprung" end 31a of the arm 31 will be greater than is the normal case, in view of the fact that this arm 31 has been deformed so as to increase the pressure at this point, and thus avoid the presence of any "chattering" or other vibrational effects that may result in detrimental operation of the tool holder. It will also be noted that additional provision is made to obviate such "chatter" and vibrational effects, in view of the fact that the blade 40 is "drawn" downwardly and to the right of Figure 3 so as to have the marginal edge portions thereof in firm and rigid contact with the complemental wall surfaces that are provided on the tool body 20.

When the cutting edge 51a has become dull for one reason or another, it is merely necessary to back the turret head T off a short distance and loosen the bolt 25 to permit raising of the clamping block 30 so that the insert bit 50 can be removed from its position on the blade 40 for a grinding operation. When the grinding operation is completed, it is merely necessary to replace the cutting bit 50 on the support blade 40 as previously described, and re-tighten the same as by turning the bolt 25. It will be apparent that the repositioning of the insert bit 50 has not operated to affect the vertical height of the cutting edge 51a, in view of the salient fact that the cutting tool 50 is supported at the same vertical height because the vertical height of the support blade 40 has not been altered during the grinding operation.

This fixed positioning of the support blade 40 results in a device that provides the maximum rigidity for the support blade. As a result of such maximum rigidity of support, the cutting edge of the insert bit is accordingly rigidly supported with respect to the tool body itself, as a result of being positively locked between the fixed support blade 40 and the clamping block 30.

It will be seen from the foregoing that there has been provided a new and novel type of cutoff tool that is characterized by the accurate and rigid positioning of an improved type of tool bit that may easily be removed from the holder therefor, and subsequently replaced after a grinding operation, for example, without any change of cutting height occurring, for the purposes of sharpening. It has been further shown how this improved type of cutoff tool is not affected by the excess of heat that occurs at the point of cutting, in view of the fact that the same has incorporated means for rapidly dissipating heat accruing at this critical point.

Figure 10:
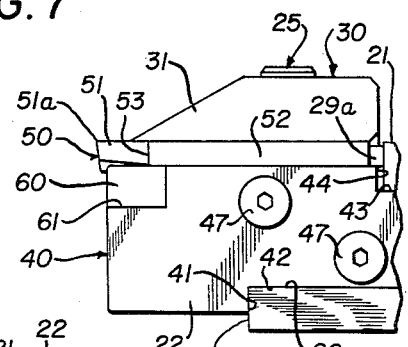
Figure 10 is a partial side elevation of a modified form of the invention.

The modified from of the invention, shown in Figure 10 of the drawings, is similar to that form of the invention shown in Figures 1 to 9 of the drawings, inclusive, with the single exception that the support blade 40 is modified to facilitate usage under extreme conditions. Accordingly, where indicated, like numerals designate like parts.

The improved results obtainable by use of the modified support blade 40 are attained by equipping the same with a carbide insert 60 that is received in an appropriate cutout 61 of the blade 40 as shown in Figure 10 of the drawing. The insert 60 is brazed or welded to cutout 61 and underlies the cutting end 51 of the insert bit 50. In this manner, the excessive temperature rise created in the area adjacent the cutting end 51 will not be detrimental to the support blade 40, in view of the fact that the carbide insert 60 is capable of withstanding such rises in temperature as occurs at this critical point.

In the event a deeper cut was to be made in any of the above cases, it is to be understood that a different support blade and clamping block could be substituted for those shown in the preferred embodiments above illustrated. Such a clamping block would have the clamping arm 31 thereof more elongate, while a similarly elongated support blade having a similar hole pattern for cooperation with the recessed surface, would be employed.

It is apparent that other revisions and changes of this type could be made, and accordingly, modifications of the invention could be resorted to without departing from the spirit thereof, or the scope of the appended claims.

This application is a continuation in part of co-pending application, Serial No. 441,305, filed July 6, 1954, and now U.S. Patent 2,737,705, and is also a divisional application of co-pending application, Serial Number 505,488, filed May 2, 1955.

What is claimed is:

1. An elongate insert bit for use with metal cutting tools, comprising: an elongate shank having opposed top and bottom surfaces, opposed side surfaces and first and second end surfaces; a cutting tip having opposed top and bottom surfaces, opposed side surfaces and first and second end surfaces, with said first end surface of said tip being fused to said first end surface of said shank, whereby said tip projects longitudinally of said shank, with said second end surfaces of said shank and said tip defining the longitudinal extremities of said bit; and a cutting edge extending transversely of said top surface of said tip at its point of juncture with said second end surface of said tip; said top and bottom surfaces of said tip and shank being respectively disposed in substantially coplanar relationship with each other; said bit having a longitudinal center; the transversely opposed points of said opposed side surfaces of said tip and said shank being spaced at equal transverse distances from said longitudinal center throughout the longitudinal extent of said bit; the elongate length of said bit being a substantial multiple of the distance between said top surfaces and said bottom surfaces; said bottom surfaces of said shank and said tip being V-shaped, with the apex of said V-shaped bottom surfaces being disposed substantially centrally between the opposed side portions thereof.

2. An elongate insert bit for use with metal cutting tools, comprising: an elongate shank having opposed top and bottom surfaces, opposed side surfaces and first and second end surfaces; a cutting tip having opposed top and bottom surfaces, opposed side surfaces and first and second end surfaces, with said first end surface of said tip being fused to said first end surface of said shank, whereby said tip projects longitudinally of said shank, with said second end surfaces of said shank and said tip defining the longitudinal extremities of said bit; and a cutting edge extending transversely of said top surface of said tip at its point of juncture with said second end surface of said tip; said top and bottom surfaces of said tip and shank being respectively disposed in substantially coplanar relationship with each other; said bit having a longitudinal center; the transversely opposed points of said opposed side surfaces of said tip and said shank being spaced at equal transverse distances from said longitudinal center throughout the longitudinal extent of said bit; the elongate length of said bit being a substantial multiple of the distance between said top surfaces and said bottom surfaces; said bottom surfaces having projecting guide means extending longitudinally thereof; said guide means being disposed substantially centrally of said opposed side surfaces of said shank and said tip.

References Cited in the file of this patent

UNITED STATES PATENTS

| | | |
|---|---|---|
| 1,885,679 | Brooks | Nov. 1, 1932 |
| 1,887,372 | Emmons | Nov. 8, 1932 |
| 1,922,178 | Schultz | Aug. 15, 1933 |
| 2,416,975 | Anthony | Mar. 4, 1947 |
| 2,595,090 | Middleton | Apr. 29, 1952 |
| 2,683,302 | Bader | July 13, 1954 |
| 2,697,866 | Greenleaf | Dec. 28, 1954 |
| 2,737,705 | Novkov | Mar. 13, 1956 |

FOREIGN PATENTS

| | | |
|---|---|---|
| 750,726 | Germany | Jan. 24, 1945 |
| 887,592 | Germany | Aug. 24, 1953 |